A. H. BRAECKLEIN.
MACHINE FOR MAKING BOTTLE SEALS.
APPLICATION FILED JUNE 13, 1916.

1,214,504.

Patented Feb. 6, 1917.
7 SHEETS—SHEET 1.

Fig. 1.

Witnesses

Inventor
Alfred H. Braecklein
By
Attorney

UNITED STATES PATENT OFFICE.

ALFRED H. BRAECKLEIN, OF BALTIMORE, MARYLAND, ASSIGNOR TO THE SANITARY SEAL MANUFACTURING COMPANY, OF BALTIMORE, MARYLAND, A CORPORATION OF MARYLAND.

MACHINE FOR MAKING BOTTLE-SEALS.

1,214,504.	Specification of Letters Patent.	Patented Feb. 6, 1917.

Application filed June 13, 1916. Serial No. 103,577.

*To all whom it may concern:*

Be it known that I, ALFRED H. BRAECKLEIN, a citizen of the United States of America, and resident of the city of Baltimore, State of Maryland, have invented certain new and useful Improvements in Machines for Making Bottle-Seals, of which the following is a specification.

This invention relates to a new and improved machine for making seals or envelops of the general type described in my Patent No. 1,145,666. These seals are of paper and in the nature of a complete covering for the bottle. As shown, they are tapered to fit the bottle and have the mouth or opening at the end which corresponds to the bottom of the bottle, the bottle being inserted top or open end first and the covering sealed at the bottom to inclose the bottle.

Important features of the invention are found first, in the combinations of parts which go to make up the seal-making machine which is entirely automatic so that it requires no attention whatever except the provision of the necessary paper stock; second, feature or features of the machine whereby all the operations incident to the manufacture of the seal are accomplished by rolling contact of the parts so that any desired speed may be attained without loss of efficiency or variation in the uniformity or quality of the product; and third, the folders or mechanism for operating the folders to form the tapered container are novel and important to the result obtained.

In the accompanying drawing, I have illustrated a machine embodying the features of my invention.

Referring to the drawings by numerals, the machine consists of a frame 1 supporting the various parts which accomplish the operation of cutting, scoring, gluing, folding and pressing the blank into the form of a completed envelop or seal.

Figures 12, 13, 14:
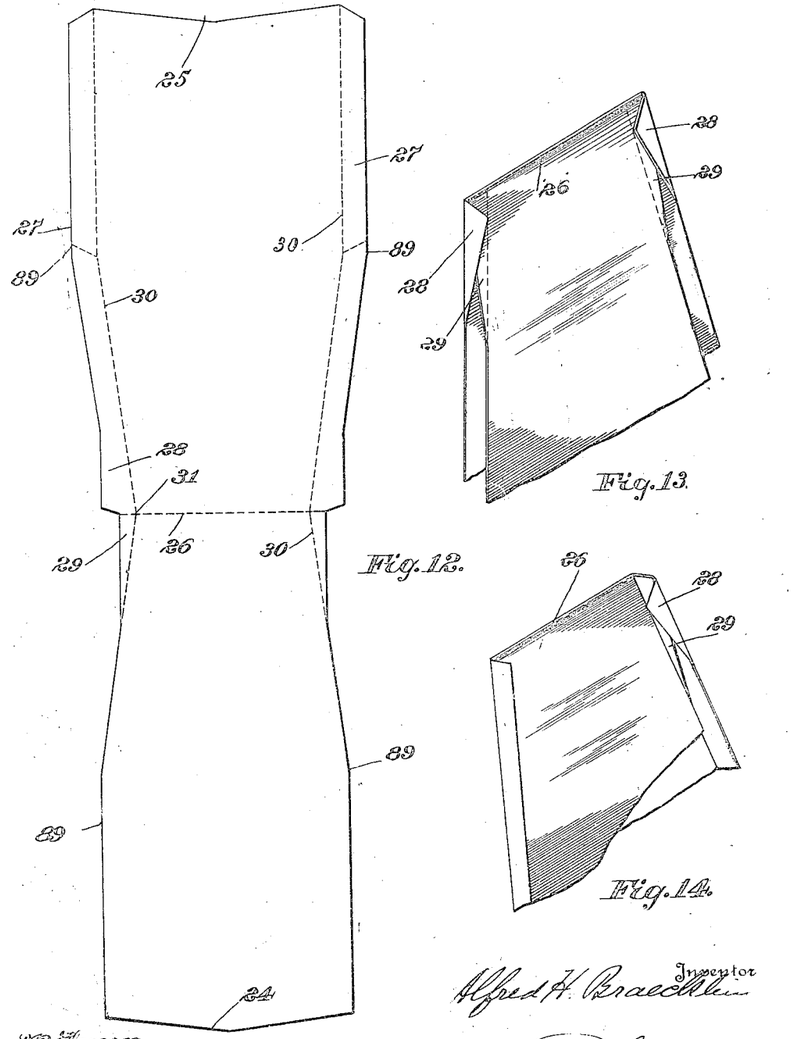
Fig. 12 is a plan of a blank cut by the machine ready for folding and pasting.
Fig. 13 illustrates the fold at the top of the seal.
Fig. 14 shows the same fold partly open.

Referring to Fig. 12, the blank which is of a length equal to the circumference of one cutting roller is several times as long as its greatest width and cut with a slight projection 24 at one end and a concavity 25 at the other. When formed into the seal, the blank is doubled about the transverse score 26 at the center and the formation of the ends makes it convenient to grip one side of the bag or envelop at the opening and then insert the bottle. The score 26 comes at the top or the closed end of the blank when the seal is completed, or in other words, the two ends are folded together about the central score and pasted at their edges, being left open at 24 and 25 where these two end edges come together. To give the seal the desired form, the blank is made to taper to its smallest dimension at the center, each end for about one-quarter of the length of the blank being straight, that is, having its two sides parallel and tapering from this point inward to the center score at 26. The two halves of the blank on each side of the center score 26 are, in the formation of the finished seal, folded together and one-half is made larger than the other to provide a flap to be folded over the smaller half and pasted. In this way the meeting edges are closed. The marginal flap or flaps (one on each side), are indicated by reference character 27 in the drawing. This flap or margin 27 is of uniform width at all points from the end edge 25 to a point adjacent but slightly spaced from the center score 26. At this point it is widened to form an extra wide portion 28 and there is a flap 29 on the other half of the blank continuous with the flap 27 but shown as less than half the width and tapering to a point a short distance from the center line. The flaps 27 and 29, illustrated and described, are defined by scoring along the lines 30 and in the completion of the seal, the two halves are folded one on the other, the flaps 28 and 29 coming into contact and allowing a considerable margin of the flap 28 beyond the flap 29, it being understood that these flaps are all paste-coated. It will be apparent that the flaps 27, being then folded over the smaller half of the blank, a paste-coated margin extending along the entire lateral edge of the larger half is brought into contact with the inner or smaller half of the blank and pressed against it. When the paste is set, the seal is completed. The object in providing the flap 29 and the wide flap 28 is to form tight corners by folding two thicknesses of the paper at the top over on themselves, as illustrated in Figs. 13 and 14. It will be clearly understood from this illustration that after the two halves of the blank have been folded, one on the other, the edge flaps 27 and the flaps 28 and 29 overlying each other, are folded over together on to the smaller portions of the blank, the pasted edge of the flap 28 extending beyond the flap 29 and being thus secured to the face of the smaller or flapless portion of the blank. In this way, we have a closed corner and a finished seal which is not only germ-proof but completely watertight and prevents the entrance into the bottle of any water which may get on the top of the seal.

Figure 1:
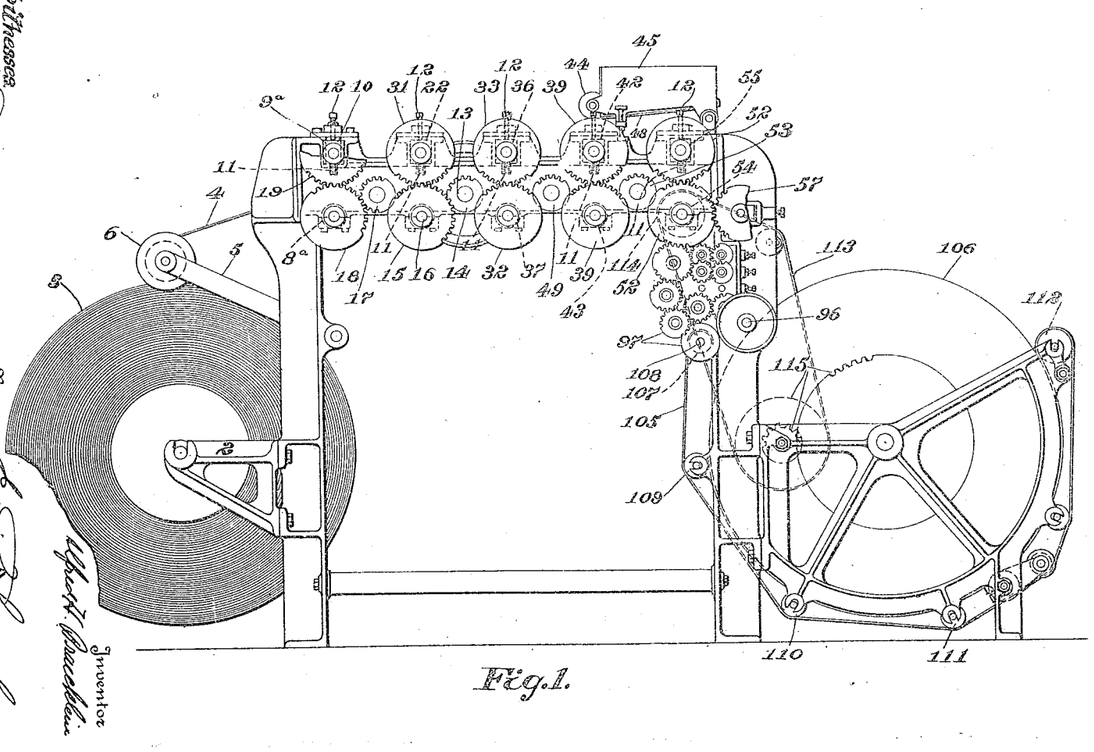
Figure 1 is a side elevation of the machine.
Figure 2:
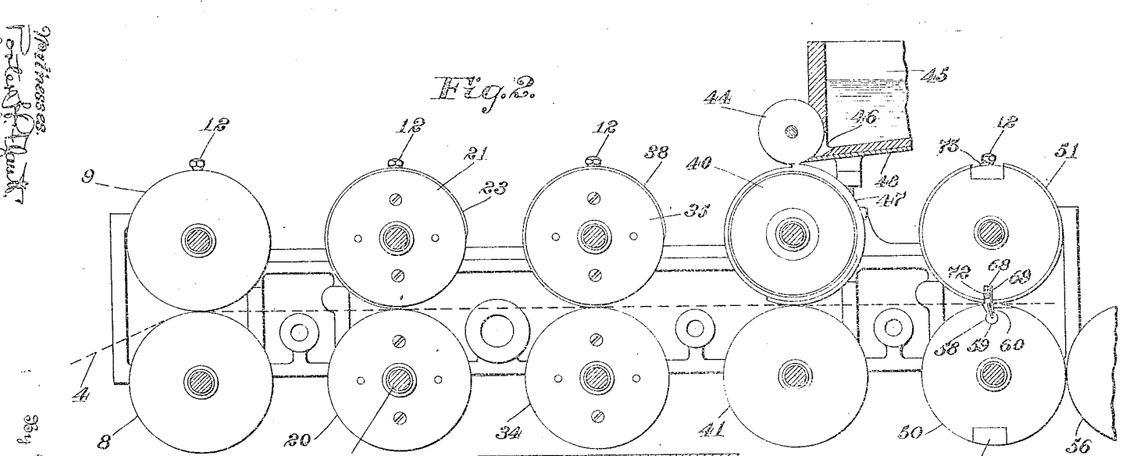
Fig. 2 is a view of the feeding, cutting, scoring, pasting and doubling rollers in their operative relation.

Referring now to the drawing of the machine, at the left on the rear end of the frame is a bracket 2 on which is supported a roll of paper 3 in the form of a web, indicated by reference character 4. Pivotally mounted on the frame near the top of the paper roll is a frame 5 carrying a guide or take-off roller 6 which rests by gravity on the top of the paper roll and serves as a means for leading the web from the roller 3 and directing it upward toward the functioning parts of the machine. The web is drawn off of the roller by tension applied as hereinafter described, passing around the guide roller 6 and causing the guide roller to rotate clock-wise, or to the right, while the stock roll rotates contraclockwise, or to the left. From the guide roller 6, the paper web is led to the feed rollers 8 and 9 which have their axes parallel to the axis of the stock roll and are mounted in suitable bearings 8ª and 9ª in the frame of the machine near the top. The upper bearing 9ª is made adjustable by means of a block 10 carrying the bearing proper, resting on a spring 11 and forced downward by means of screw 12. Thus the grip of the feed rollers is positive and adjustable. The feed rollers draw the paper from the stock roll and feed forward to the cutting, scoring and pasting rollers, etc. All the rollers, with the exception of the stock roll 3 and the guide roller 6 are driven from the rotating shaft 13 which carries a toothed gear 14 meshing with a gear 15 on the shaft 16 of one of the cutter rollers 20 and 21 to be described. This gear in turn meshes with an idler 17 which engages and turns a toothed gear 18 on the bottom one of the feed rollers. This gear meshes with toothed gear 19 which turns the top feed roller. The cutting rollers 20 and 21 are parallel to the feed rollers, preferably in the same horizontal plane, and spaced forward a convenient distance. The upper roller, which may be of a circumference equal to the length of or any multiple of the length of a blank, is mounted in an adjustable bearing 22, similar to the bearing 9ª described in connection with the upper cutting roller and both rollers are driven from the gear 14 on the shaft 13, the gear 15 which meshes with the gear 14 being secured to the lower cutting roller and meshing with a gear 31 rigidly connected to the upper cutting roller.

The blank to be cut is shown in plan in Fig. 12 and the cutter 23 is arranged in the form of the outline of the blank with a small opening or gap 23' to provide for a connecting web between the blanks. The cutter consists of a sharpened ridge on the cylindrical surface of the roller 21 outwardly or radially disposed. The lower roller 20 is plain and the cutting operation is performed by the contact of the edges of the cutters on the upper roller with the cylindrical surface of the lower roller through the paper which is passing between them.

Next beyond the cutting rollers in the direction of the travel of the paper which is from left to right in Fig. 1, are the scoring rollers 34 and 35, mounted in suitable bearings 36 and 37, the lower bearing being stationary and the upper one adjustable after the manner of the bearing of the upper feed and cutting rollers. These rollers are driven by gears 32 and 33 rigidly connected to the lower and upper rollers or the shafts thereof, respectively, the gear 32 on the lower roller meshing with the gear 14 on the shaft 13.

Scoring is accomplished by means of a blunt edge 38 on the upper roller which is pressed against the paper as it passes between the upper and lower scoring rollers, serving to compress the fibers along the line of the edge 38 and thus score the paper and make it flexible at the score without cutting it. The scoring edge is arranged on the surface of the upper roller in the pattern indicated by dotted lines 30 in Fig. 12 and the scoring rollers are preferably made of a circumference equal to the length of the blank as are the cutting rollers, so that one blank is cut and scored at each revolution of the two sections of the rollers.

Next beyond the scoring rollers in the direction of the feed are the paste rollers 40 and 41 mounted in bearings 42 and 43 for the upper and lower roller respectively, the lower bearing 43 being stationary and the upper one 42 adjustable as in the case of the bearings of the other top rollers already described. The rollers 40 and 41 are driven by means of toothed gears 39 rigidly connected to each roller and meshing with an idler 49 driven from the gear 32 on the lower scoring roller.

Bearing on the upper paste roller from above is a paste feed roller 44 driven by frictional contact with the paste roller 40, as hereinafter described, and supplied with paste from a paste pot or tank 45 having a slot 46 near the bottom which receives a segment of the roller 44, the portion of the surface presented to the paste of course changing as the roller rotates in contact with the paste roller 40. The paste is applied to the blank by means of a raised portion 47 on the surface of the upper paste roller 40 which conforms to the area of the flaps 27 and is so arranged as to engage this portion of each blank as the blank passes between the paste rollers 40 and 41. It will of course be understood that the raised portion of the roller 40 is the only part which comes in contact with the paste feeding roller 44 and hence, the only part which is coated with paste. The thickness of the paste on the roller 44 may be regulated by an adjustable knife 48 on the paste pot 45, having its edge presented to the roller 44 to determine the clearance of the roller.

Figures 5, 6:
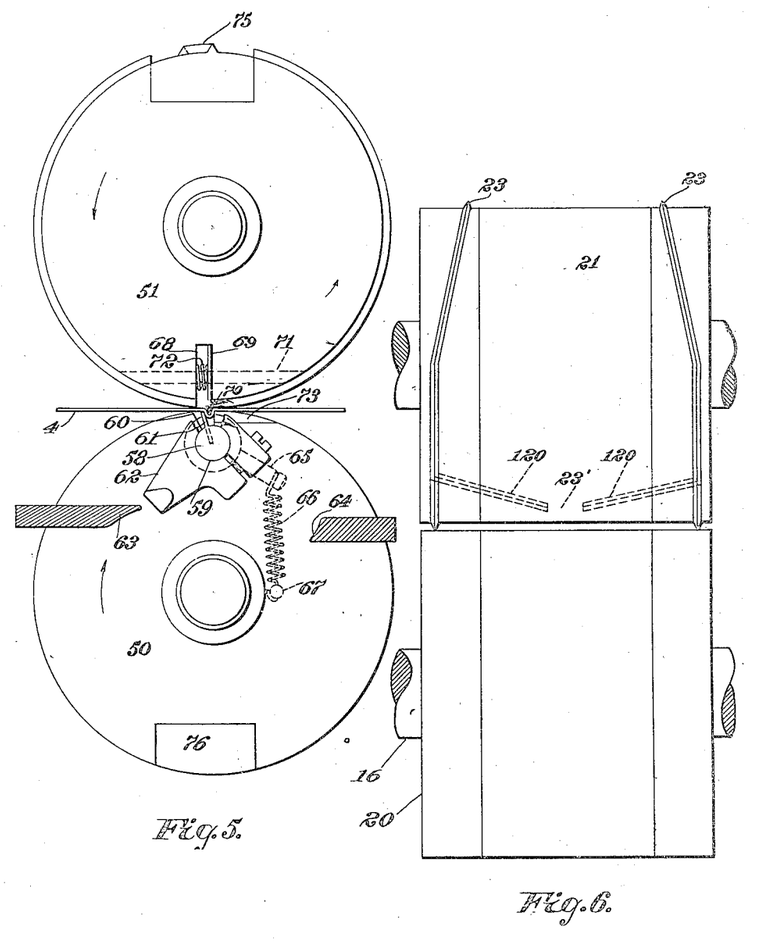
Fig. 5 is an end view showing particularly the gripping mechanism of the doubling rollers.
Figs. 6, 7, and 8 are elevations of the cutting, scoring and pasting rollers, respectively.

Continuing in the direction of the feed, next beyond the paste rollers 40 and 41 are the doubling rollers 50 and 51 each having rigidly secured thereto a gear 52, the two gears being in mesh with each other and the lower gear being driven by an idler 53 meshing with the gear 39 carried by the lower paste roller 41. The bearings 54 and 55 of the doubling rollers are like those of the two feeding rollers, the upper one being adjustable and the lower one stationary. The rollers 50 and 51 are shown in end view in Fig. 5. As the blank before reaching these rollers, has already been coated with paste which covers the edge flaps 27 and this paste is still exposed, the roller 51 which engages the blank from above, that is, the side which is coated with paste, is made sufficiently narrow to engage the central portion of the blank without coming in contact with the paste-coated surfaces. The function of the rollers 50 and 51 with the pressing roller 56 which is in contact with the roller 50 and has its axis in the same horizontal plane, being driven by a gear 57 rigidly connected to the roller 56, the gear 57 meshing with the gear 52 of the lower doubling roller 50, is to double the blank upon itself, the crease or point of folding being on the transverse line 26, see Fig. 12. To this end, the roller 50 is provided with a stud 58 adjacent the surface and parallel to the axis and mounted to oscillate or rotate in a suitable bearing 59 in the body of the roller. Connecting the bearing orifice 59 with the outer cylindrical surface of the roller is the slot 60 extending along the surface in the direction of the axis and in this slot, projecting slightly from the surface of the roller is a blade 61 with its length parallel to the axis of the roller and its back edge seated in the stud 58. The outer edge of this blade is rounded rather than sharp. As a means for controlling the stud 58 and the blade 61, the stud is provided with a radial arm 62 adapted to engage stationary dogs 63 and 64 on the frame and a second oppositely disposed radial arm 65 connected by means of a tension spring 66 to a point 67 near the center of the roller. The upper roller 51 is likewise slotted at 68 and in the slot is a second blade 69 having its outer edge 70 parallel to the axis of the roller, projecting beyond the surface and rounded rather than sharp. The blade 69 is loosely held in position by pins 71 at right angles to the blade and pressed against the forward side of the slot by springs 72. The rollers 50 and 51 are preferably of the same diameter and circumference as the rollers previously described, meaning the feed rollers, cutting rollers, scoring rollers, pasting rollers, etc., the circumference being equal to the length of the cut blanks. When the machine is set up, the two rollers are so placed that the upper blade 69 enters the slot 60 in front of the blade 61. To this end, the blade 61 is swung backward by the contact of the arm 62 with the dog 63, leaving an opening between the blade and the forward edge of the slot 60 at the time the two blades approach in the rotation of the roller, this opening serving to receive the blade 69. The relation of these rollers to the preceding rollers is such that the blank traveling forward through the machine arrives with its central portion, indicated by the line 26, in Fig. 12, directly beneath the blade 69 and over the forward portion of the slot 60 between the blade 61 and the forward edge of the slot 60 when the blade 69 is about to enter the slot 60 as hereinbefore described, the blade 61 having been swung slightly backward to receive it. As the rollers rotate, the upper one left-handed and the lower one right-handed, as seen in Fig. 5, the arm 62 of the stud 58 is released from dog 63, permitting the spring 66, engaging the arm 65 to rotate the stud 58 and press the blade 61 forward against the paper, gripping the blade 69 and the portion of the paper which has been pushed by blade 69 into the crack between the blade 61 and the forward surface of the slot 60. As the rollers continue to rotate, the curvature of the rollers causes the blade 69 to be withdrawn from the slot 60 leaving the folded edge of the paper gripped by the blade 61 in the slot 60. To prevent wear at this point and give a constant action, a wear plate 73 has been provided. With the paper thus gripped, the roller 50 continues to rotate carrying the edge of the blank forward along the circumference of the roller 50 until it approaches the line of contact of the roller 50 with the roller 56. Just as the folded edge of the paper enters the grip between the rollers, the arm 62 of the stud 58 comes in contact with the stationary dog 64 swinging the blade 61 backward and releasing the grip on the folded edge of the paper so that the doubled blank is carried downward between the rollers 50 and 56. In order that the paste on the edges of the blank may not be smeared and the whole operation upset, the roller 56, as well as the roller 50, is made sufficiently short to engage the blank between the paste-coated edges. After being separated from the web by the cutter 75 on the roller 51 which engages the cutting block 76 on the roller 50 severing the connecting web between the present blank and the one next following which web is left by the cutters on the cutting roller 21, the doubled blank with the paste-coated edge flaps 27 still exposed is fed downward between the rollers 50 and 56 to the folding rollers 80 and the guides or plows 81.

Figure 3:
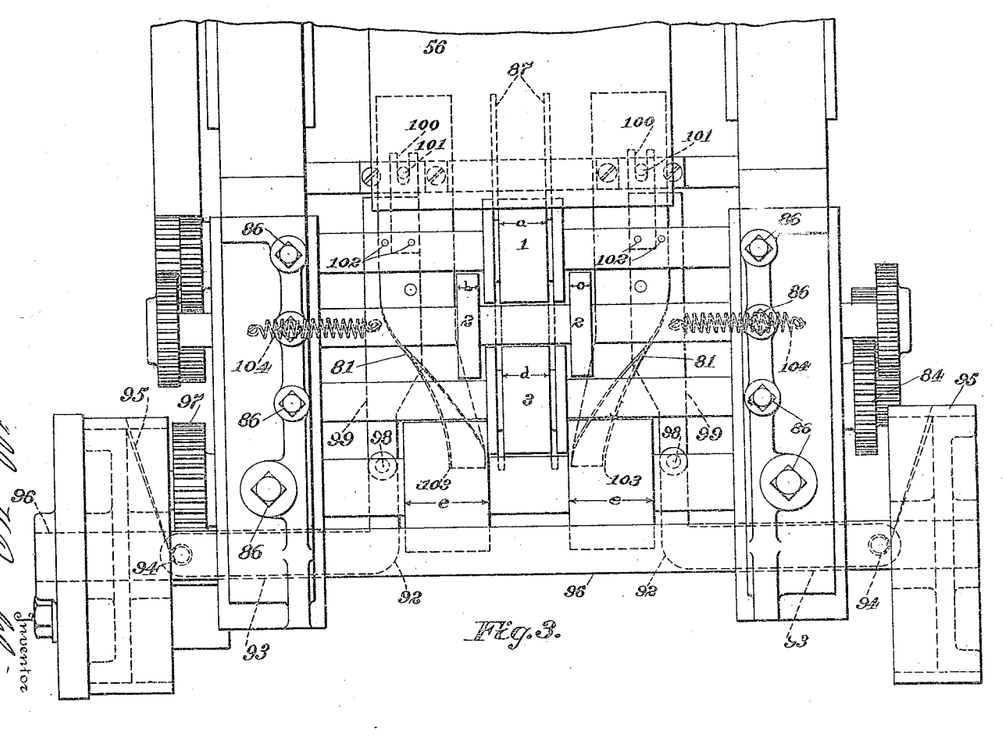
Fig. 3 is a view at right angles to Fig. 1, taken from the delivery end of the machine, the drier mechanism, etc., being removed.
Figure 4:
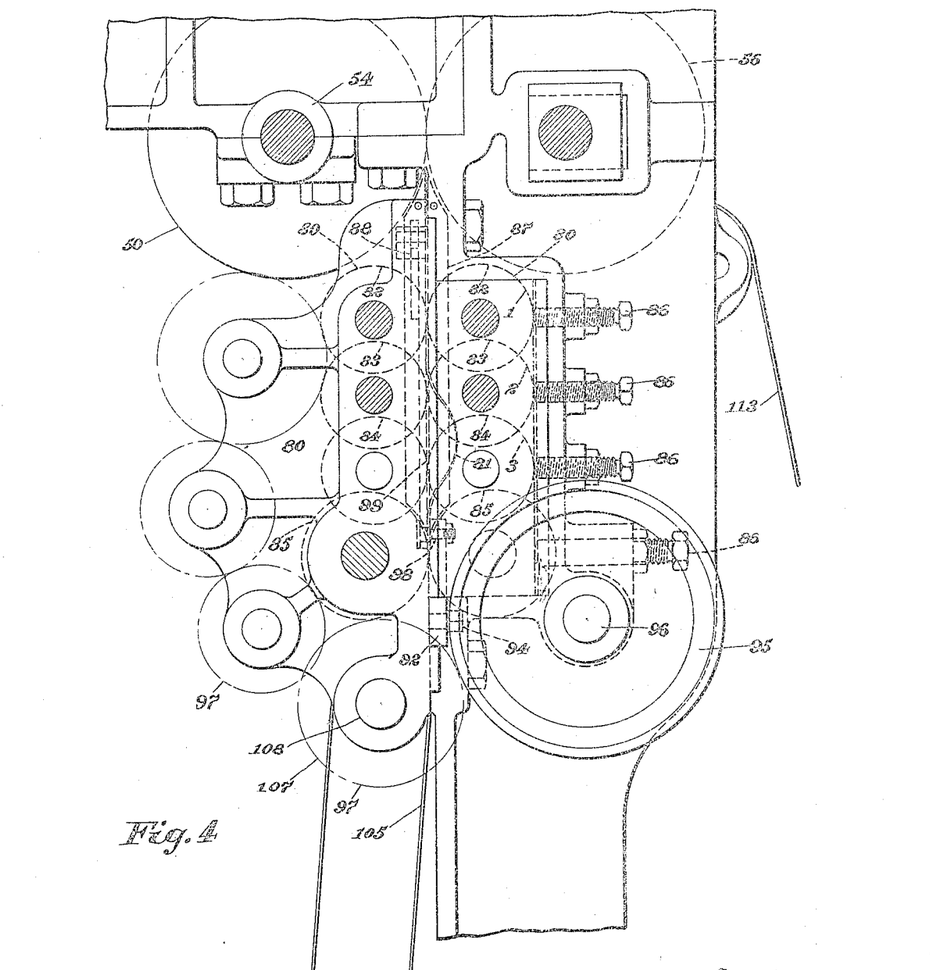
Fig. 4 is a side elevation of the folding rollers.

The folding rollers 80 consist of a series of four pairs of rollers, the axes of each pair being in the same horizontal plane and the rollers of each pair being in contact, the contact lines of the various pairs of rollers being in the same vertical plane. As shown, the rollers of the upper three pairs 82, 83 and 84 are of the same diameter, the rollers of the lower pair being larger. To attain and maintain the desired degree of pressure between the rollers, the bearings of the forward roller of each pair are made adjustable toward the other roller, as by means of screws 86. The blanks are guided in their downward course from the doubling rollers by means of parallel vertical guide rods 87 spaced apart by a sufficient interval to permit the blanks to pass freely between them. In order to feed the blanks downward during the folding operation through the rollers with certainty, and to prevent buckling and wrinkling, it is necessary that the contact points of the rollers shall be as near together as possible and to this end, the rollers are dovetailed into each other, as shown in Fig. 3. The rollers 82 have each a central section of full diameter of length $a$, the rollers 83 have two narrow sections of full diameter $b$, $c$ on each side of the sections $a$ of the roller 82, and the rollers 84 have a central section $d$ of full diameter corresponding to the central sections $a$ of the rollers 82 and likewise fitting in between the full diameter sections $b$ and $c$ of the rollers 83. The central full diameter sections $a$ and $b$ of the rollers 82 and 84 are slotted to receive the guide rods 87. The rollers 85 each have two full diameter sections $e$ on each side of the center, spaced apart to admit the full diameter central sections $d$ of the rollers 84 and of sufficient width to permit them to roll the flaps in folded position. The plows or folding guides 81, see Figs. 3 and 4, are at each side of the folding rollers, between the shafts of the rollers, arranged to operate on paper in the plane of contact of these rollers, the lower ends of the guides which come last in contact with the paper entering well between the rollers 85 almost to the line of contact of the full diameter sections $e$.

The folding apparatus thus far described would be sufficient to turn the edge flaps of a straight or parallel sided blank but while the edges of the blanks in question, see Fig. 12, are straight near the two ends, the blank tapers from the points 89 about one-quarter the length of the entire blank from each end to the central line 26 on which the blank is doubled so that the flaps 27, referring now to the blank as being doubled and moving forward with the folded edge 26 forward, first diverge at an angle of 20 to 30 degrees and then from the point 89 to the bottom of the seal which in the present operation is at the rear, they are parallel or straight so that it is necessary to provide means for folding the flaps 27 first where they converge and then where they change direction and run straight, parallel to each other, it being understood that the inner flap 29 is turned with the adjacent contacting portion 28 of the flap 27.

In order to provide for the change of direction of the flap 27 from the diverging portion to the straight or parallel portion, it is necessary to make a corresponding change in the relation of the folding means. This is done by swinging the plows through an angle corresponding to the angle between the parallel and converging portions of the flap. To this end, the plows are mounted to swing and change the direction of the crease which marks the juncture of the flap with the flat portion of the blank so that this crease will follow the score as shown in Fig. 12, the lower ends of the plows where the turning of the flap is completed having a nearly parallel motion so the point of folding and its relation to the roller are not changed. This is accomplished by means of a sliding link 92 on each side which operates in a guide 93 in the frame, the links having each a follower 94 at one end which engages a cam 95 on a shaft 96 driven by suitable gears 97 which mesh with the gears operating the folding rollers, preferably so that the shaft 96 has a single revolution for each revolution of the feed rollers and therefore for each complete operation of the machine resulting in the production of a finished seal.

The sliding link 92, as shown, is turned up at right angles at the end opposite the follower and carries a pivot 98 by which it is connected to a plate 99, forked or slotted at 100 to engage a stationary pivot pin 101 on the frame, the plow 81 being rigidly secured to the plate 99 by any suitable means, as rivets 102. The follower 94 is held in contact with the cam surface by means of a tension spring 104 connected at one end to the plate 99 and at the other to a pin on the machine frame.

As I have pointed out, the link 92 is a rigid member sliding in a fixed rectilinear guide-way 93 so that all parts of the link 92, including the pivot 98, move in a straight line and as the lower end of the plow is immediately adjacent the pivot 98, the plate 99 being rigidly connected to the plow, said end of the plow likewise has a substantially parallel motion, the slot 100 moving up and down relatively to the pin 101 to compensate for the variation of the path of the pivot 98 and the point of the plow 103 from a true circular arc. Thus we have not only a change of position but a change of direction of the guide sufficient to provide for the change of direction or angle to each other at which the two parts of each flap 27 are set.

It will be noticed that the bottom folder rollers, which may be properly termed pressing rollers 85, have their full diameter sections e so placed that they contact directly in line with the ends of the plows so that the blank with the flaps turned over and pasted is received immediately into these rollers which engage the edges, particularly the folded flaps, pressing them tightly into place and completing the operation of the pasting.

From the folder rollers, the seal passes downward between the belt 105 and the drying wheel 106, the belt being driven by a small pulley 107 on the drive shaft 108 and passing over guide pulleys 109, 110, 111 and 112, spaced about the periphery of the drying wheel which is driven in any suitable manner, as by a belt 113 from a pulley 114 on the shaft of the lower doubling roller and train of gearing 115. After passing around the drying wheel between the drying wheel and the belt which serves to hold them in pasted position, the seals or envelops are partially dry, sufficiently to keep them in a folded or pasted position until completely dry, and they are accordingly delivered from the machine at the point where the belt passes around the pulley 112.

While the operation of the machine has been brought out in connection with the description, it will be reviewed for the purpose of clearness.

Figure 7:
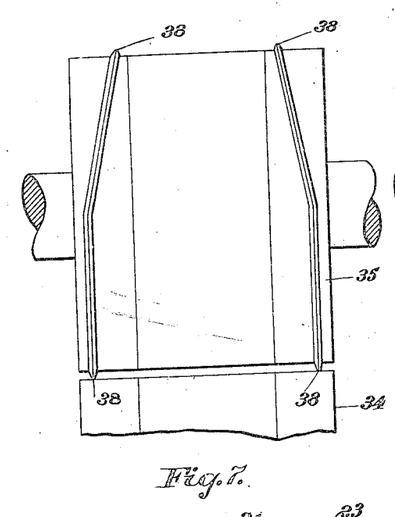
Figure 8:
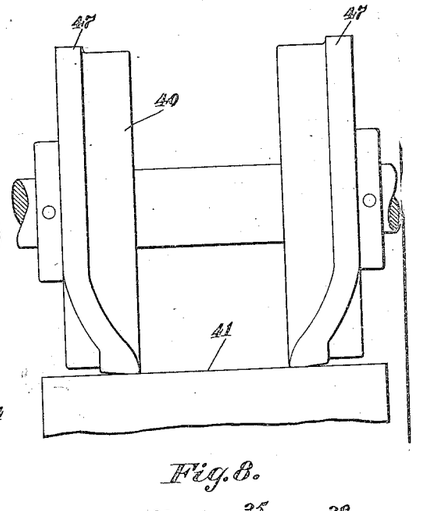
Figure 9:
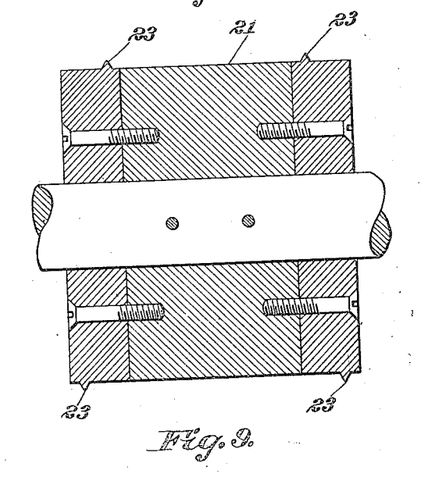
Fig. 9 is a transverse section through the upper cutting roller.
Figure 10:
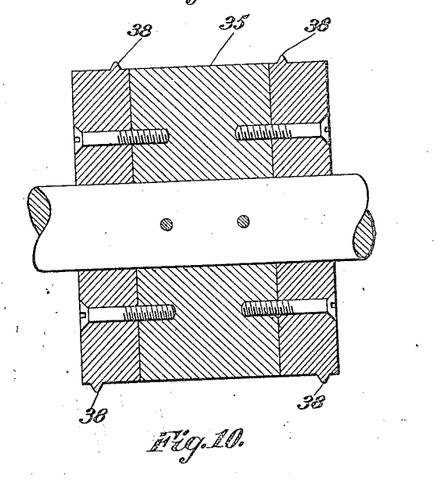
Fig. 10 is a transverse section through the upper scoring roller.
Figure 11:
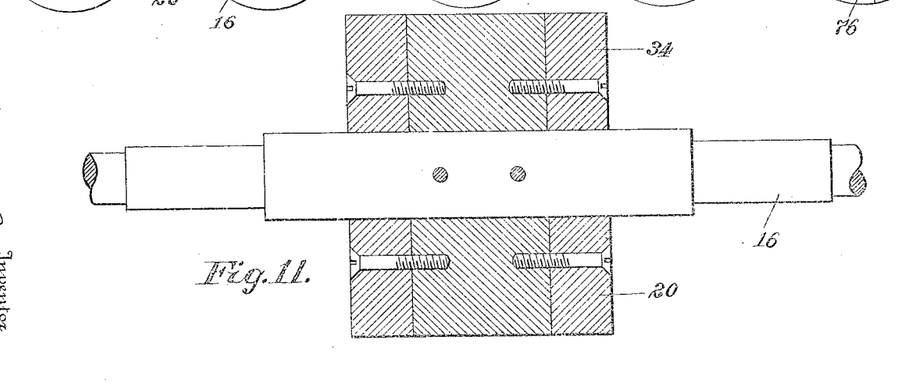
Fig. 11 is a transverse section through the lower feed, cutting, scoring roller, etc.

The paper web in the roll 3 is drawn over the take-off rollers 6 by the feed rollers 8 and 9 whence it is fed to the cutting rollers shown as equal in circumference to the length of the blank provided with a blade or cutter on the upper roller of an outline similar to the blank as shown in Fig. 12, but having a gap or opening 23' in the transverse portion 120 corresponding to the ends 24 and 25 which, it will be understood, are preferably formed by this single cutting edge severing the rear end of each blank from the forward end of the next succeeding blank. The blanks are intended to be led through the machine, each being drawn forward by the next preceding and therefore kept connected in the form of a single piece of material until severed by the blade 75 on the folding roller 5 which is of a width equal to or slightly greater than the aforesaid gap in the transverse portion of the blade. From the cutting rollers, see Fig. 6, the blanks thus connected are led forward to the scoring rollers, the upper one of which is provided with a blunt edge in the form of the dotted lines on the blank, see Fig. 12. The blunt edge is pressed against the paper which is supported on the lower roller compressing the fibers along the line thus engaged, forming a score or line along which the paper is easily folded without cutting or weakening the fiber. From the scoring rollers, see Fig. 7, the blanks still connected as described, are led to the paste rollers, the upper roller of which is formed with a raised portion 47, see Fig. 8, conforming to the outline of the flaps 27, 28 and 29 between the dotted lines 30 and the outer edges of the blank. These raised portions are coated with paste by means of the roller 44 fed from the paste pot 45. From the paste rollers, the blanks are fed forward to the doubling rollers 50 and 51 which operate as already described, the center of the blank defined by line 26 in Fig. 12 being gripped by the blade 61 and the forward face of the notch 60 in the roller 50 so that the creased edge at the center of the blank is fed forward and downward between the lower doubling roller 60 and the roller 56, the ends 24 and 25, see Fig. 12, being doubled together and the connection between this blank and the next succeeding blank being cut by the blade 75 on the top roller 51 acting in conjunction with the cutting block 76 on the lower roller 50. From here the blank goes to the folding rollers and plows 80 and 81 which turn the edge flaps 27, 28 and 29, already paste-coated as described, along the dotted lines 30 and over the adjacent edges of the smaller and flapless portion of the blank. The blank with the flaps thus folded is then fed downward to the drying wheel, whence it is delivered in finished condition.

I have thus described my invention specifically and in detail in order that its nature and operation may be fully understood;

however, the specific terms herein are used descriptively rather than in their limiting sense and the scope of the invention is defined in the claims.

I claim—

1. In a machine for making bottle seals or wrappers, means for supplying a continuous paper web, a successive series of rollers consisting of feeding rollers, cutting rollers, scoring rollers, pasting rollers, doubling rollers, all operating on the continuous web, with means for rotating the rollers, means for severing the doubled blank from the web, and folding and pressing means arranged in the order named.

2. In a machine for making bottle seals and covers, means for feeding a continuous paper web, means for cutting the web to form connected blanks from a continuous web leaving the blanks connected by narrow links, means for creasing the blanks to form edge flaps, means for coating the edge flaps with paste, means for doubling the blanks, means for severing them from the web and means for folding the pasted flaps over the adjacent portions of the blanks and pressing them in position to form a finished container or seal.

3. In a machine for making bottle seals or coverings of paper, means for feeding a paper web, means for cutting a tapering blank, means for scoring the blank to form an edge flap, means for coating the edge flap with paste, means for doubling the blank, folding means to operate on the edge flap to fold it over the adjacent portion of the blank, and means for varying the position of the folding means to provide for the tapering of the blank and the change of direction of the edges and the edge flaps of the blank.

4. In a machine for making seals or coverings for bottles, means for feeding a paper web, means for cutting from the web a blank having a straight portion and a tapering portion, the tapering portion being on both sides of the center and converging toward the center, the portion of the blank on one side of the center being wider than the portion of the blank on the other side of the center, means for forming a transverse center score, means for scoring the larger part of the blank adjacent the edges to form an edge flap, means for coating the edge portion with paste, means for doubling the blank about the center score, means for folding the edge flaps over the edge portions of the other half of the blank, means for varying the position of the folders to provide for the change of direction of the flap, and means for pressing the flap.

5. In a machine for making paper seals or coverings for bottles, means for feeding a paper web, means for cutting from the web an elongated blank which is straight at the ends and tapered at the center, the tapered portion converging toward the center, the portion of the blank on one side of the center being wider than the portion on the other side, means for coating the edge of the blank with paste, means for doubling the blank about the center, means for folding the edges of the wider part of the blank over the adjacent edges of the narrower portion, and means for varying the position of the folding means to compensate for the change of direction of the edges of the blank.

6. In a machine for making paper seals or covers for bottles, means for feeding a paper web, a pair of cutting rollers, one roller having a smooth surface, the other having a raised cutting edge shaped to cut an elongated blank straight at both ends, the cutter having a gap or opening to form a tab by which the blank is attached to the web, the central portion being tapered, the edges converging toward the center of the blank, the cutting rollers being of a circumference equal to the length of the blank, scoring rollers, one being smooth, the other having a dull knife edge to crease the blank centrally and also adjacent the edge of one-half of the blank which is made larger than the other half to provide for an edge flap thus formed, means for coating the edge flaps of the blank with paste, consisting of a pair of paste rollers, one of which has a raised portion to conform with the flap with means for coating this raised portion with paste, three doubling rollers, two of which coöperate to engage the blank near its center and feed the central fold or edge forward in advance of the rest of the blank, the three rollers coöperating with one of the other two to receive the blank when it is presented to feed it forward in doubled condition with the folded edge first, a series of folder rollers dovetailed into each other to engage the blank at closely adjacent points, folding plows to engage the edge flaps and fold them over on the adjacent portions of the smaller half of the blank, and means for varying the position of the plows to provide for the change of direction of the edges of the blank.

7. In a machine for making seals for bottles having a straight portion and a tapering neck portion, means for cutting blanks having a straight portion and a tapering portion to correspond to the shape of the bottle, means for folding the edges of the blanks consisting of a plow, means for feeding the blanks to and through the plow, and means for changing the position of the plow to conform to the change of direction of the edge of the blank.

8. In a machine for making seals for bottles having a straight portion and a tapering neck portion, means for cutting blanks having a straight portion and a tapering portion to correspond to the shape of the bottle, means for folding the edges of the blanks consisting of a plow, means for feeding the blanks to and through the plow, and means for changing the position of the plow to conform to the change of direction of the edge of the blank, said means consisting of means for pivotally supporting the plow and means for varying the position of the pivot and at the same time swinging the plow whereby the operative portion is given a parallel motion transverse to the length of the fold.

9. In a machine for making bottle seals or coverings of paper, means for feeding a paper web, means for cutting a paper blank, having a tapering portion, means for scoring the blank to form an edge flap, folding means to operate on the edge flap to fold it over the adjacent portions of the blank, and means for varying the position of the folding means to provide for the tapering of the blank and the change of direction of the edges of the blank.

10. In a machine for making paper seals or covers for bottles, means for cutting a partially tapered paper blank, means for scoring the blank to form an edge flap, folding means including a plow to engage one edge flap and fold it over, and means for varying the position of the plow to provide for change of direction of the edge of the blank.

11. In a machine for making seals for bottles, means for cutting elongated tapering blanks, means for folding the blanks to bring the ends together, means for turning the edges of the blanks including a plow, and means for varying the position of the plow to provide for the taper.

Signed by me at Baltimore, Maryland, this 12 day of June 1916.

ALFRED H. BRAECKLEIN.

Witnesses:
ZELLA KUHN,
JOHN E. CROSS.